(12) United States Patent
Amir

(10) Patent No.: US 10,094,922 B1
(45) Date of Patent: Oct. 9, 2018

(54) HYBRID HEIGHT AND LOCATION ESTIMATION IN RTLS

(71) Applicant: CenTrak Inc., Newton, PA (US)

(72) Inventor: Israel Amir, Newton, PA (US)

(73) Assignee: CENTRAK, INC., Newton, PA (US)

( * ) Notice: Subject to any disclaimer, the term of this patent is extended or adjusted under 35 U.S.C. 154(b) by 615 days.

(21) Appl. No.: 14/616,934

(22) Filed: Feb. 9, 2015

(51) Int. Cl.
G08B 5/22 (2006.01)
G01S 15/02 (2006.01)
G01S 17/02 (2006.01)

(52) U.S. Cl.
CPC .......... G01S 15/025 (2013.01); G01S 17/023 (2013.01)

(58) Field of Classification Search
CPC ...... G01S 5/22; H04B 10/1149; H04W 4/008; H04W 4/021; H04W 4/02
See application file for complete search history.

(56) References Cited

U.S. PATENT DOCUMENTS

| 8,139,945 | B1 | 3/2012 | Amir | |
|---|---|---|---|---|
| 8,604,909 | B1 * | 12/2013 | Amir | H04B 10/1149 340/10.1 |
| 2013/0286166 | A1 * | 10/2013 | Lee | G01S 5/30 348/51 |

* cited by examiner

Primary Examiner — Raj R Gupta
(74) Attorney, Agent, or Firm — Maldjian Law Group LLC

(57) ABSTRACT

A position location system and method, the system including: an infrared (IR) transmitter, a first and a second ultrasound (US) transmitter, the first and a second US transmitters arranged at respective predetermined distances from a reference plane, an IR receiver configured to receive an IR signal from the IR transmitter, a US receiver configured to receive a first US signal from the first US transmitter and a second US signal from the second US transmitter; and a processor coupled to a memory and further coupled to the IR receiver and the US receiver, the processor configured to detect: a time of flight (ToF) of the first US signal from the first US transmitter to the US receiver; and a ToF of the second US signal from the second US transmitter to the US receiver.

22 Claims, 6 Drawing Sheets

200

300

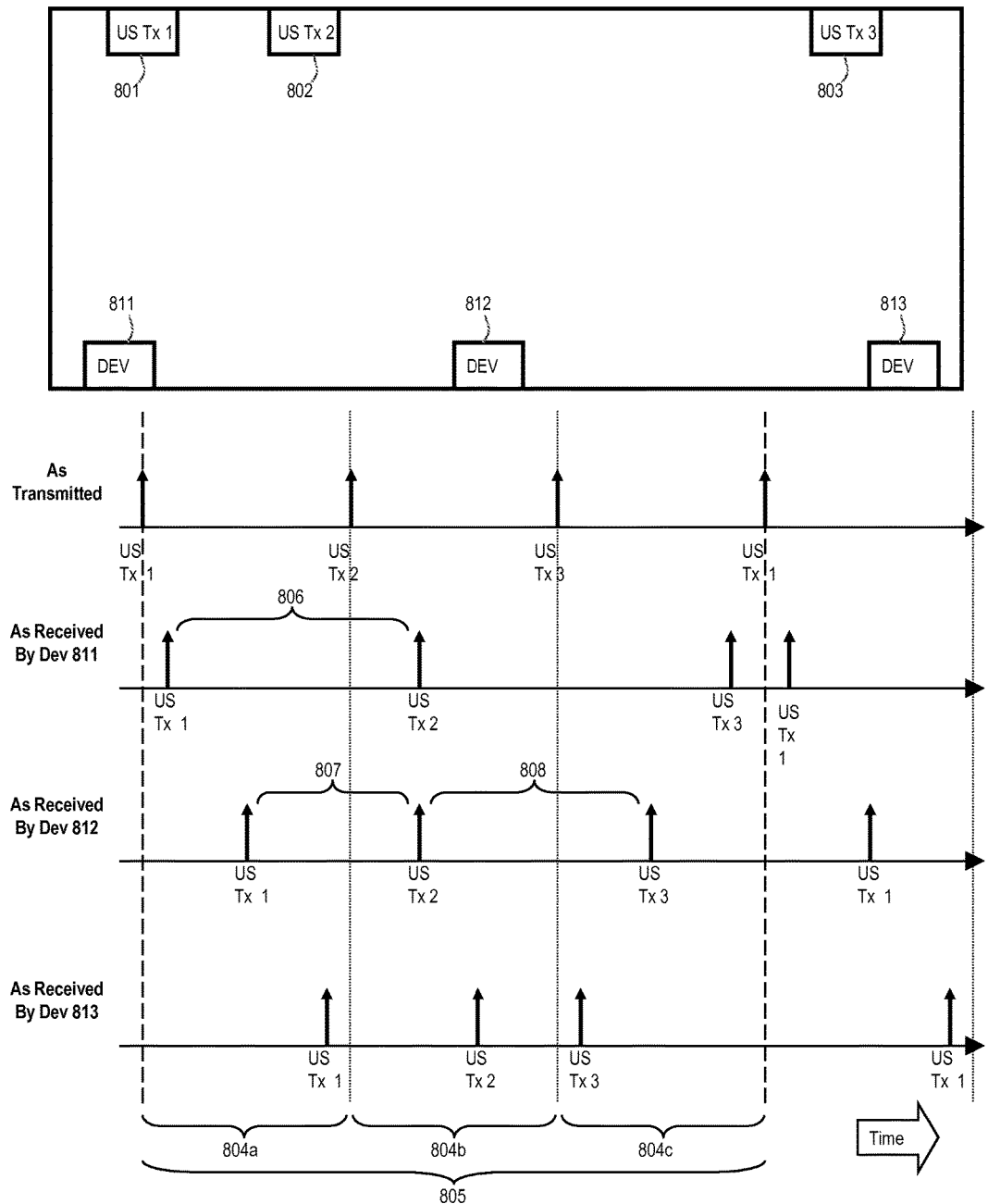

HYBRID HEIGHT AND LOCATION ESTIMATION IN RTLS

BACKGROUND

Field of the Invention

Embodiments in accordance with the present invention relate to methods and systems for sensor data reporting with high positional accuracy and low power consumption.

Description of Related Art

Indoor Real-Time Location (RTL) Systems (RTLS) are popular in the healthcare industry for a variety of applications ranging from asset tracking through patient and staff tracking, environmental or patient sensing (e.g., temperature), hygiene compliance, elopement (i.e., a patient leaving a facility without authorization), theft prevention, and so forth.

Conventional RTL systems typically use radio frequency (RF) transmission to determine location. The RF-based methods may be augmented with infrared (IR) transmission as a localization method in order to improve accuracy to support room and sub-room level accuracies. An IR receiver typically is incorporated into a portable device (i.e., a tag) and IR transmitters are incorporated into base stations that are scattered in rooms and corridors within the enclosure. Typically, each the IR base stations transmits an identification (ID) to the portable devices, and the location of the portable devices is determined by their vicinity to a base station.

The basic advantages of synchronization of IR based systems are described in U.S. Pat. No. 8,139,945 ("the '945 Patent"), which is hereby incorporated by reference in its entirety. Timing synchronization information is transmitted using a plurality of stationary IR base stations and a plurality of portable devices. Each IR base station is configured to receive the timing synchronization information and to transmit a corresponding IR location code in a time period based on the received timing synchronization information.

Known systems of the background art ordinarily are used for locating an object in an indoor setting concentrate on locating an object in two dimensions, e.g., in a plane parallel to a floor of a room. Known systems either do not measure indoor positions in three dimensions (3-D), or do not make this measurement with sufficient accuracy in a low-cost, low-power consumption system that can be battery-powered for an extended period of time. Indoor 3-D positions may be calculated from the vertical offset between a reference point or plane (e.g., a floor, a ceiling, or a fixed-location emitter) and an object whose position is being sought, in particular for fall detection.

Therefore, a need exists to provide a low-cost, low-power consumption system to measure height of an object in an indoor setting.

SUMMARY

Embodiments in accordance with the present disclosure enable and perform direct measurement of a Time of Flight (ToF) from an emitter to a device whose location or height needs to be estimated, such as an RTLS tag. In contrast, methods of the background art use Differential Time of Arrival (DTOA) because direct estimation of the actual time of flight is not practical in the background art.

Embodiments in accordance with the present disclosure include a wireless infrared-aided location system, including: an infrared (IR) transmitter, a first and a second ultrasound (US) transmitter, the first and a second US transmitters arranged at respective predetermined distances from a reference plane, an IR receiver configured to receive an IR signal from the IR transmitter, a US receiver configured to receive a first US signal from the first US transmitter and a second US signal from the second US transmitter; and a processor coupled to a memory and further coupled to the IR receiver and the US receiver, the processor configured to detect: a time of flight (ToF) of the first US signal from the first US transmitter to the US receiver; and a ToF of the second US signal from the second US transmitter to the US receiver.

Embodiments in accordance with the present disclosure include a wireless position location system, including a plurality of base stations, each base station comprising a respective infrared transmitter and ultrasound (US) transmitter; and a receiver comprising: an infrared (IR) receiver configured to receive IR signals from at least one IR transmitter; and a US receiver configured to receive US signals from at least one US transmitter.

Embodiments in accordance with the present disclosure include a position location system, the system including: a first ultrasound (US) transmitter located at a first predetermined location and configured to transmit a first periodic burst signal; a second US transmitter located at a second predetermined location, the second predetermined location different than the first predetermined location and configured to transmit a second periodic burst signal, the second periodic burst signal having a predetermined timing offset from the first periodic burst signal; a US receiver configured to receive a first US signal from the first US transmitter and a second US signal from the second US transmitter; and a processor coupled to a memory and further coupled to the US receiver, the processor configured to detect a closer of the first US transmitter and the second US transmitter based upon a time difference between the reception times of the first US transmitter and second US transmitter.

Embodiments in accordance with the present disclosure include a method for position location, the method including: receiving a periodic infrared (IR) signal; receiving a first ultrasound (US) signal from a first predetermined location; receiving a second US signal from a second predetermined location; determining a first time of flight (ToF) of the first US signal to the US receiver; determining a second ToF of the second US signal to the US receiver; and determining a location based upon the first ToF and the second ToF.

The preceding is a simplified summary of embodiments of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings wherein like reference numerals in the various figures are utilized to designate like components, and wherein:

FIG. 8 depicts timing of a plurality of US signals as received from a plurality of US emitters at a portable device, in accordance with another embodiment of the present invention.

Figure 1:
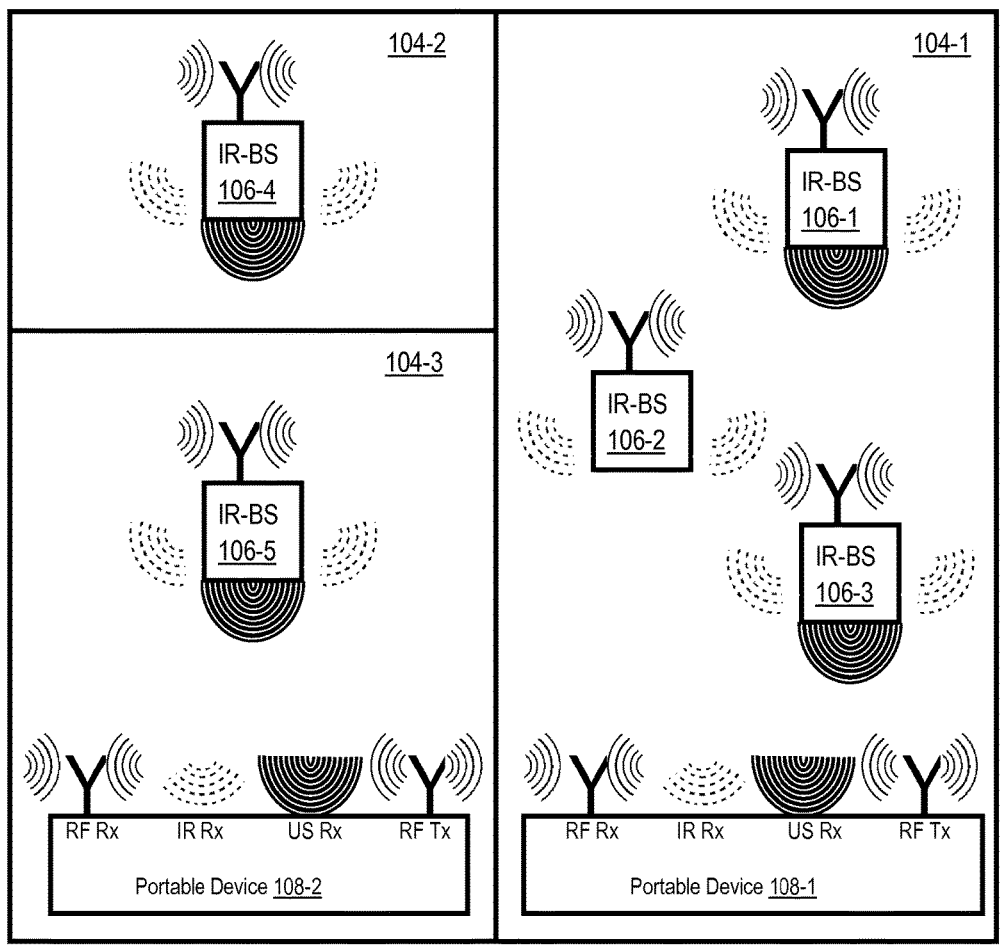
FIG. 1 is a block diagram of a system for locating and identifying portable devices in an enclosure, according to an embodiment of the present invention.
Figure 1:
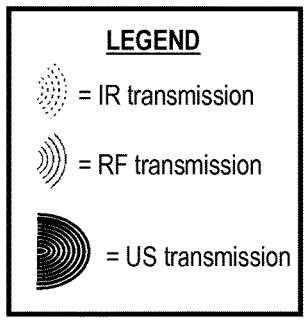
Figure 1:
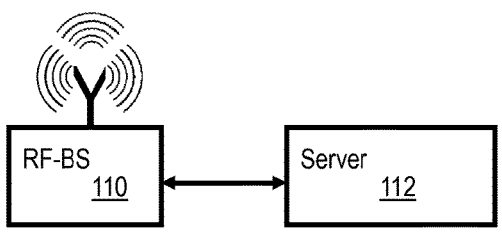

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The disclosure will be illustrated below in conjunction with an exemplary communication system. Although well suited for use with, e.g., a system using a server(s) and/or database(s), the disclosure is not limited to use with any particular type of communication system or configuration of system elements. Those skilled in the art will recognize that the disclosed techniques may be used in any communication application in which it is desirable to utilize location sensors and other sensors (e.g., temperature and humidity) that communicate with a central monitor.

The exemplary systems and methods of this disclosure may also be described in relation to software, modules, and associated hardware. However, to avoid unnecessarily obscuring the present disclosure, the following description omits well-known structures, components and devices that may be shown in block diagram form, are well known, or are otherwise summarized.

In the following detailed description, numerous specific details are set forth in order to provide a thorough understanding of embodiments or other examples described herein. In some instances, well-known methods, procedures, components and circuits have not been described in detail, so as to not obscure the following description. Further, the examples disclosed are for exemplary purposes only and other examples may be employed in lieu of, or in combination with, the examples disclosed. It should also be noted the examples presented herein should not be construed as limiting of the scope of embodiments of the present invention, as other equally effective examples are possible and likely.

As used herein, the term "Wi-Fi" or "conventional Wi-Fi" refers generally to a bi-directional radio communication technology that operates based on one or more of the Institute of Electrical and Electronics Engineers (IEEE) 802.11 family of standards, which are incorporated herein by reference. The IEEE 802.11 standards specify the RF and protocol characteristics of a bi-directional radio communication system.

As used herein, the term "module" refers generally to a logical sequence or association of steps, processes or components. For example, a software module may comprise a set of associated routines or subroutines within a computer program. Alternatively, a module may comprise a substantially self-contained hardware device or circuit device. A module may also comprise a logical set of processes irrespective of any software or hardware implementation.

As used herein, the term "transmitter" may generally comprise any device, circuit, or apparatus capable of transmitting an electrical, electromagnetic, infrared, ultrasonic, or optical signal. As used herein, the term "receiver" may generally comprise any device, circuit, or apparatus capable of receiving an electrical, electromagnetic, infrared, ultrasonic, or optical signal. As used herein, the term "transceiver" may generally comprise any device, circuit, or apparatus capable of transmitting and receiving an electrical, electromagnetic, infrared, ultrasonic, or optical signal.

The term "computer-readable medium" as used herein refers to any tangible storage and/or transmission medium that participates in storing and/or providing instructions to a processor for execution. Such a medium may take many forms, including but not limited to, non-volatile media and volatile media. Non-volatile media includes, for example, NVRAM, flash media, or magnetic or optical disks. Volatile media includes dynamic memory, such as main memory. When the computer-readable media is configured as a database, it is to be understood that the database may be any type of database, such as relational, hierarchical, object-oriented, and/or the like.

RTL systems are known that include base stations that transmit IR signals (i.e., IR base stations) with their respective base station ID (BS-ID) to portable devices that are equipped with IR receivers. Upon reception of a BS-ID, the portable device transmits both the device ID and the received BS-ID to a reception device, for example, by radio frequency (RF) or IR transmission. The RTL system may include a server that associates the BS-ID with the device ID (received from the portable device by the reception device). In this manner, the position of the portable device may be displayed as the position of the IR base station. In exemplary implementations, both base stations and tags are battery operated.

Referring now to FIG. 1, a block diagram is shown of a system 100 for determining a location and an identity of portable devices 108 in an enclosure 102. System 100 may include a plurality of IR and/or US emitters 106-1 . . . 106-N ("emitter"), one or more portable devices 108 and at least one RF base station (RF-BS) 110. In some embodiments, RF base station 110 may be a Wi-Fi access point (i.e., an RF access point). An individual but unspecified emitter may be referred to as emitter 106 or emitter 106-*n*. The emitters may be referred to collectively as emitters 106. An individual but unspecified portable device may be referred to as portable device 108 or portable device 108-*n*. The portable devices may be referred to collectively as portable devices 108.

RF base station 110 may transmit timing synchronization information (TSI) signal, for example, in a beacon, to emitters 106 and portable devices 108 that are each equipped with RF transceivers, by RF transmission. The TSI may be used by emitters 106 to transmit a corresponding BS-ID, e.g., an IR location code, in a period of time after receiving the TSI. The period of time for emitters 106 to transmit the respective BS-ID signals may be fixed or transmitted as a part of the information carried by the beacon.

Enclosure 102 may include a plurality of separate zones 104, which typically coincide with individual rooms or zones within enclosure 102. For example, zone 104-1 represents a corridor. Each room or zone may be provided with at least one emitter 106. For example, corridor 104-1 includes emitters 106-1, 106-2, 106-3.

Portable devices 108 may be provided for persons or apparatuses. The portable devices 108 may include an IR receiver and an RF transmitter or transceiver which are coupled to each other. In this manner, the RF transceiver may receive the TSI and if so desired may transmit received BS-ID and its device ID at an RF carrier frequency to RF base station 110. Portable devices 108 further include an ultrasonic receiver.

The modulated carrier signal received by RF base station 110 may be decoded to reproduce the BS-ID and the device ID.

Embodiments in accordance with the present disclosure divide a 3-D spatial location measurement system into several subsystems. Some embodiments are a hybrid system of infrared (IR) and ultrasound (US) transmission technologies in order to perform 3-D spatial location measurements. However, the methods are adaptable by persons of skill in the art to other transmission technologies, in order to achieve similar results.

Height Measurement.

Three-dimensional spatial location measurement in an (x, y, z) Cartesian coordinate system includes measurement of a distance in the z-axis (e.g., height), with respect to a known, predetermined reference point (e.g., a location of a transmitter) or with respect to an XY plane (e.g., a floor or a ceiling). A 3-D a spatial location measurement system in accordance with an embodiment of the present disclosure may include both an IR emitter and an US emitter (collectively, emitters). The emitters may be housed in a single physical unit with known, predetermined positioning of the emitters with respect to a housing of the physical unit, or may be provided as separate physical units oriented in a known, predetermined spatial configuration with respect to each other. Both the IR emitter and the US emitter may transmit signals having a known, predetermined timing configuration, e.g., with respect to each other and/or with respect to a fixed timing reference.

For example, an IR emitter may transmit a periodic IR beacon, and two US emitters may transmit an ultrasonic signal having a known, predetermined timing relationship relative to the IR transmissions. A device whose height should be measured (e.g., a portable tag) may be designed to receive the IR signal and the two US signals. A processing system incorporated within or coupled to the tag, using knowledge of time relationships at transmission between the IR signals and the US signals, can deduce a respective ToF of each US signal to the tag from the respective US emitter. Embodiments may compute a height (i.e., z-axis offset) as illustrated below in further detail with respect to FIG. 3.

Embodiments in accordance with the present disclosure rely upon the realization that IR signals travel at the speed of light, which is essentially instantaneous for the time scales and distances of interest. In contrast, US signals travel at the speed of sound in air at the air pressure of the room, i.e., approximately 300 meters (1,000 feet) per second at sea level, which is slower than the IR signals by a factor of about $1 \times 10^6$. Therefore, the IR signals may be deemed to travel essentially instantaneously, in comparison to the US signals.

Figure 2:
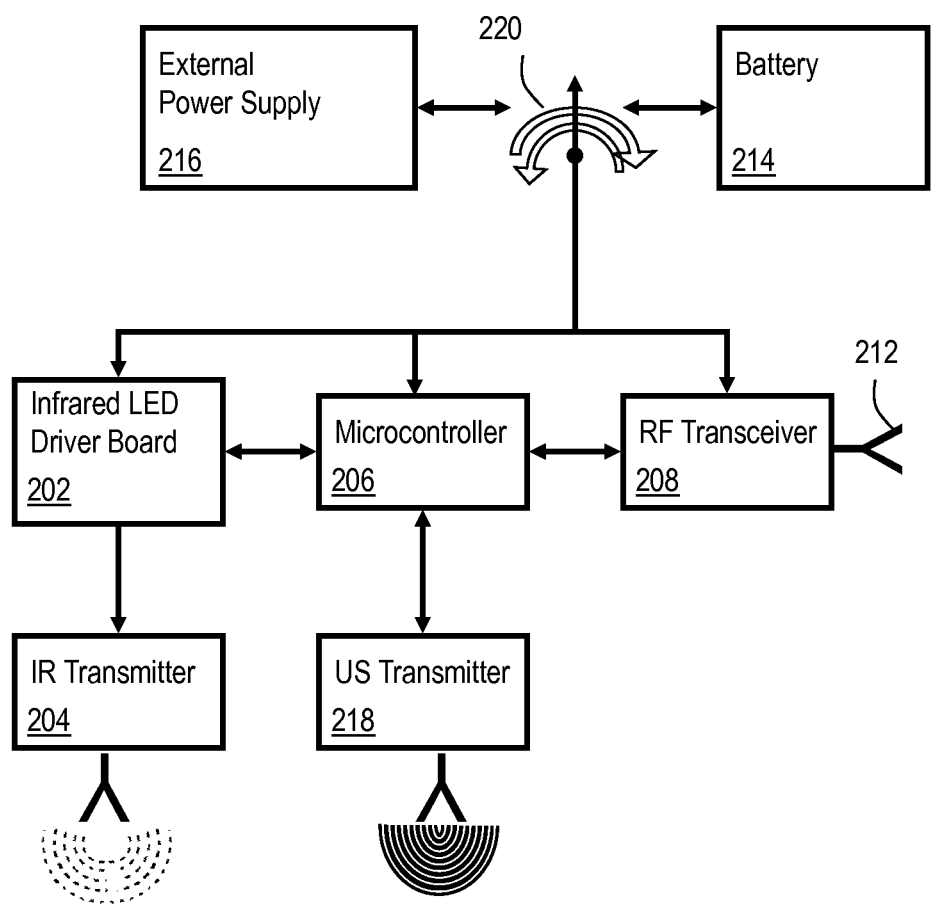
FIG. 2 is a block diagram of an infrared (IR) and ultrasound (US) emitter, according to an embodiment of the present invention.

FIG. 2 illustrates a block diagram of an embodiment 200 of emitter 106. Embodiment 200 includes a microcontroller 206 coupled to an IR driver board 202, which in turn is coupled to IR transmitter 204. Microcontroller 206 is further coupled to US transmitter 218 and may further be coupled to an RF transceiver 208, which in turn is coupled to an RF antenna 212. Active components are coupled to a power source such as battery 214 or external power supply 216 (e.g., conventional AC power). The power source optionally may be selected by switch 220.

Although not shown in FIG. 2, an ID associated with emitter 106 and/or its installed location may be stored by embodiment 200, for example, in a memory of microcontroller 206. Driver board 202 may be configured to transmit the associated BS-ID through IR transmitter 204. It is understood that IR transmitter 204 may include any device suitable for transmitting an IR burst that includes the associated ID.

Figure 3:
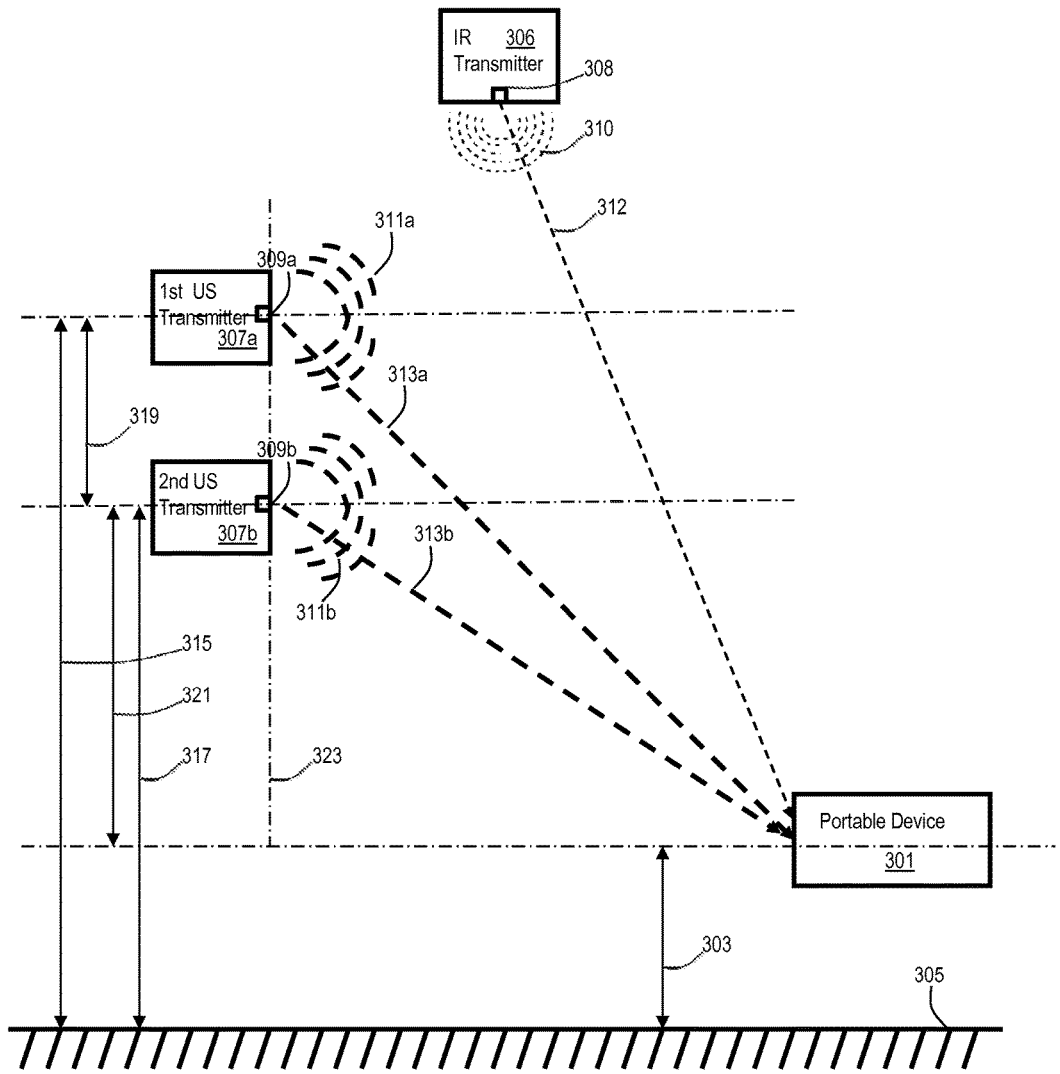
FIG. 3 depicts a configuration for height determination, in accordance with an embodiment of the present invention.

FIG. 3 illustrates system 300 in accordance with an embodiment of the present disclosure. The plane of FIG. 3 contains the X-axis and Z-axis, and the Y-axis is perpendicular to the plane of FIG. 3. System 300 includes a portable device 301 (e.g., a tag) whose position is sought. Portable device 301 may be attached or coupled to a moveable object whose position is being tracked or queried, e.g., an asset, a patient, etc. Tracking may include relatively frequent, scheduled, and/or substantially continuous position determinations. Queries may include relatively infrequent and/or ad hoc position determinations. Position determinations and movements of interest includes positions and movements that are significant with respect to the size of the object or the size of a room or location in which system 300 is deployed. Small movements usually are of less concern since for the purpose of an RTLS system, locations or movements usually are being tracked for the purpose of finding the object being tracked, or detecting when the object is in an impermissible orientation (e.g., fallen on a floor).

Attachment to a moveable object may include a rigid attachment, and may include attachment to an enclosure, carrier, etc. of the object being tracked (e.g., a box, a pallet, a cart, a dolly, a stretcher, etc.). Attachment to a moveable object may also include a loose coupling (e.g., hanging by a lanyard, by a keyring, by a tie strap, attachment to an enclosure such as a bag or a gown, which itself is moveable with respect to its contents, etc.). Movement permitted by the loose coupling should be small with respect to movements of interest being measured. The attachment is not illustrated in FIG. 3. Portable device 301 is illustrated as being situated at a distance 303 in the Z-axis from a reference plane 305, which is illustrated in FIG. 3 as a plane parallel to the XY plane. For example, reference plane 305 may be a floor, and distance 303 may be a height of portable device 301 above the floor.

System 300 further includes multiple transmitters, e.g., IR transmitter 306, first US transmitter 307a and second US transmitter 307b. US transmitter 307a and US transmitter 307b may include a respective element 309a and element 309b from which US signal 311a and US signal 311b propagate. For example, element 309a may include an ultrasound transducer mounted substantially flush with the body of US transmitter 307a, and so forth. Elements 309a, 309b are deemed to be a reference point from which heights and distances to the respective US transmitter 307a, 307b are measured. Signals 311a, 311b are illustrated as propagating along respective direct paths 313a, 313b to portable device 301, and more specifically to an ultrasound receiver in portable device 301. Direct paths 313a, 313b represent the apparent distance of US transmitter 307a, 307b (respectively) from portable device 301. Reflections and multipath routes from transmitters 307a, 307b to portable device 301 are ignored which, having a longer path length, would take longer to arrive at portable device 301 than direct paths 313a, 313b.

IR transmitter 306 may include an element 308 from which IR signal 310 propagates. For example, element 308 may include an infrared LED and associated IR-transparent window. IR signal 310 is illustrated as propagating along direct path 312 to portable device 301, and more specifically to an IR receiver in portable device 301. Reflections and multipath routes from IR transmitter 306 to portable device 301 are ignored.

A physical offset distance in portable device 301 between IR and US receivers (not illustrated in FIG. 3) is either negligible with respect to the magnitude or error tolerance in the position determining system, or are known a priori and may be included along with knowledge of the orientation of portable device 301 as a correction factor in the calculations below. The error tolerance in the position determining system is approximately +/− three feet in the X or Y axes, and +/− two inches in the Z-axis. A more accurate Z-axis measurement may be desirable in order to distinguish certain benign conditions (e.g., patient sitting in a chair) from alarm conditions that need further attention (e.g., a patient laying on a floor). In contrast, measurement tolerance in the X-axis or Y-axis may only need to be good enough to direct a human to a vicinity of the portable device 301 in order to find portable device 301 or the object to which it is attached. In some embodiments, the X, Y coordinates are not needed to distinguish between benign conditions and an alarm condition.

US transmitter 307a is mounted at distance 315 from reference plane 305, and US transmitter 307b is mounted at distance 317 from reference plane 305. Distance 315 and distance 317 are measured from the locations of elements 309a, 309b on respective US transmitters 307a, 307b. Distance 315 and distance 317 are known, predetermined distances that may be measured during system installation. Differential distance 319 is the distance between US transmitter 307a and US transmitter 307b, and is equal to (distance 315)−(distance 317). Differential distance 321 is the distance between US transmitter 307B and portable device 301, and is equal to (distance 317)−(distance 303).

An axis 323 is formed between element 309a and element 309b, and is extrapolated beyond element 309a and element 309b. In some embodiments, axis 323 is substantially parallel to the Z-axis. Heights illustrated in FIG. 3 are in a direction parallel to axis 323.

For the configuration illustrated in FIG. 3, the distance 303 may be calculated in accordance with the relationship of Equations (1)-(4), in which X represents distance 303, $H_1$ represents distance 317, $H_2$ represents distance 315, $h_2$ represents distance 321, $D_1$ represents the length of path 313b, and $D_2$ represents the length of path 313a.

$$X = H_1 - h_2 \quad (1)$$

$$(D_2)^2 - (H_2 + h_2)^2 = (D_1)^2 - (h_2)^2 \quad (2)$$

$$(D_2)^2 - (H_2)^2 - (h_2)^2 - 2H_2 h_2 = (D_1)^2 - (h_2)^2 \quad (3)$$

$$h_2 = \frac{(D_2)^2 - (D_1)^2 - (H_2)^2}{2H_2} \quad (4)$$

Note that because US emitters are oriented along axis 323, the configuration of FIG. 3 allows for an estimation of distance 303 anywhere in an area or physical volume able to receive signals 310, 311a and 311b. As long as distance 303 is always less than distance 317, there should not arise a situation in which path 313a is the same length as path 313b, which would result in a signal collision.

In accordance with an embodiment of the present disclosure, IR transmitter 306 may transmit an IR signal that includes an identification (ID) field (i.e., a room ID). The room ID may be used by portable device 301 to recognize what room portable device 301 is presently located within. Alternatively, at least one of US transmitters 307a, 307b may transmit an ultrasonic signal that includes the room ID. Transmitting the room ID only by use of IR transmitter 306 allows for simpler and less power-consumptive US transmitters 307a, 307b, since US transmitters 307a, 307b do not need to transmit the room ID in order for portable device 301 to determine its room location. Similarly, if at least one of US transmitters 307a, 307b is transmitting the room ID, there is no need for IR transmitter 306 also to transmit the room ID, and IR transmitter 306 may be simpler and less power-consumptive.

In another embodiment in accordance with the present disclosure, the IR signals from IR transmitter 306 may be synchronized with the IR receiver on portable device 301 such that portable device 301 energizes its IR receiver and its US receiver when IR and/or US signals are expected to be received, and thereby reduce power consumption by de-energizing its receivers when no IR and/or US signal is expected to be received.

For example, if the room under coverage is, e.g., 15'W× 15'L×8'H (maximum diagonal length approximately 22.7 feet) and portable device 301 knows when the US signals traveling at 1,000 feet per second were transmitted by one or more of US transmitters 307, then a time window of about 25-30 mS (accounting for the maximum propagation time diagonally across the room, the time duration of the US signal itself, and the maximum timing error) should be sufficient during which to energize the US receiver of portable device 301 in order to receive the US signals.

A sufficiently large time window may be calculated by considering the largest room that portable device 301 may be operated within. If portable device 301 may be moved between rooms having differing physical dimensions that are known in advance, and corresponding different installation geometries (e.g., physical separation distances) of IR transmitter 306 and US transmitters 307a, 307b that are also known in advance, then a database (e.g., a mapping) may be consulted to determine a maximum time window for the room identified by the room ID, and for use in Eq. (1)-(4).

Similarly, if portable device 301 knows when the IR signal was transmitted by IR transmitter 306, then portable device 301 may need to turn on its IR receiver only for the duration of the IR signal plus margin for any timing error. The propagation time of the IR signal is essentially instantaneous for this scenario, so no additional time for energizing the IR receiver is needed in order to account for IR propagation delay. Furthermore, the as-received timing of the IR signals may be used to provide coarse timing information and help reduce timing errors by portable device 301. Reduced timing errors results in less power consumption because of smaller time windows during which IR and/or US receiver circuitry needs to be energized in order to receive a respective signal.

Figure 4A:
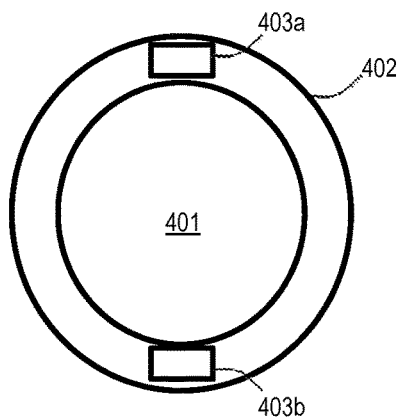
FIG. 4A depicts a dual-technology emitter, in accordance with another embodiment of the present invention.
Figure 4B:
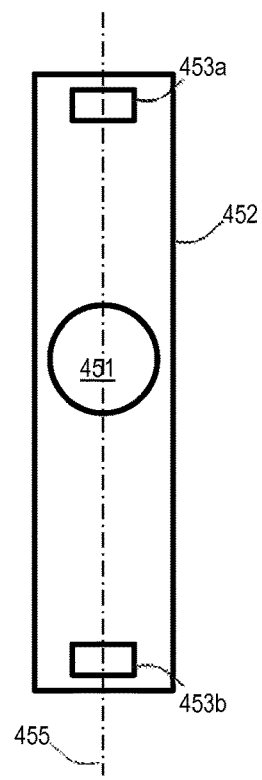
FIG. 4B depicts another embodiment of a dual-technology emitter, in accordance with another embodiment of the present invention.

FIG. 4A illustrates embodiment 400 of a dual-technology transmitter in accordance with an embodiment of the present disclosure. Embodiment 400 includes housing 402, which integrates an IR emitter 401 and two US emitters 403a, 403b along with driving circuitry into a single device housing 402. The US emitters 403a, 403b may be positioned at opposite edges of housing 402 in order to make the vertical distance between US emitters 403a, 403b as large as possible and thus improve the height estimation accuracy. Housing 402 may be designed to be wall-mountable. Although housing 402 is illustrated as having a circular cross-sectional shape, other shapes may be used. For example, FIG. 4B illustrates embodiment 450 includes housing 452 having a rectangular cross-sectional shape to hold IR emitter 451 and US emitters 453a, 453b. The rectangular shape of housing 452 may further separate the two US emitters 453a, 453b compared to the separation of housing 402. Furthermore, the rectangular shape of housing 452 may encourage a user to hang or install housing 452 in a vertical direction (i.e., major axis 455 aligned vertically). Other shapes besides circular and rectangular may be usable as a dual-technology transmitter housing. A functional block diagram of embodiments 400 and 450 may be shown by the block diagram of FIG. 2.

X, Y and X, Y, Z Position Estimation.

Although the system of FIG. 3 and the emitters of FIGS. 4A-4B are useful for determining height along a direction parallel to axis 323, there may exist ambiguity in determining position in the X-axis and Y-axis, because the configuration of FIG. 3 is substantially rotationally symmetric around axis 323 when IR signals 310 are assumed to propagate essentially instantaneously.

However, by use of three (or more) US transmitters rather than the two US transmitters of FIG. 3, pinpoint accuracy in the X, Y and Z axes may be determined by principles of triangulation. It is assumed that the three (or more) US transmitters are not collinear.

Figure 5:
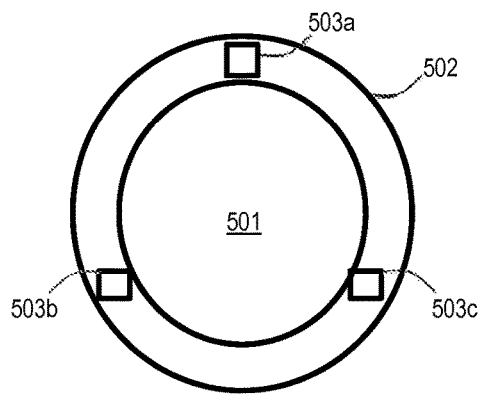
FIG. 5 depicts another embodiment of a dual-technology emitter, in accordance with another embodiment of the present invention.

FIG. 5 illustrates embodiment 500 of a dual-technology transmitter in accordance with an embodiment of the present disclosure. Embodiment 500 is useful for X, Y and X, Y, Z (i.e., 3-D) position determination. Embodiment 500 includes housing 502, which integrates an IR emitter 501 and three US emitters 503a, 503b, 503c along with driving circuitry into a single device housing. The US emitters 503a, 503b, 503c may be positioned at the periphery of housing 502, approximately equi-distant from each other, in order to make the separation distance between US emitters 503a, 503b, 503c as large as possible and thus improve the 3-D position estimation accuracy. Housing 502 may be designed to be wall-mountable or ceiling-mountable. Although housing 502 is illustrated as having a circular cross-sectional shape, other shapes may be used.

A method of three-dimensional position location will be illustrated by use of embodiment 500, however the method may be used with any IR and US transmitters of suitable relative geometric orientations. The method assumes that the transmitters (e.g., the transmitters of embodiment 500) are already installed at fixed, known locations, e.g., at predetermined locations on a ceiling. This may be satisfied if a location of a known housing such as housing 500 is installed at a fixed location and in a fixed orientation. This also may be satisfied if three US transmitters are positioned at widely-separate points on the ceiling of a room, e.g., at separate corners of a room where walls intersect the ceiling. The installation may be customized for each room, depending on room geometry, location of other objects or fixtures that might interfere with access, signal propagation, wiring access, and so forth. Objects and fixtures may include lighting fixtures, windows, furniture, availability of power or network wiring, electromagnetic compatibility with other equipment, etc.

Assume for purpose of illustration and without loss of generality that embodiment 500 is installed at a fixed location and in a fixed orientation on a ceiling of a room. The method may proceed by estimating the three different distances from the three US emitters to the position of the US receiver in portable device 301.

Suppose that three US transmitters are located on a ceiling and are positioned to form three corners of a 90-degree right triangle on the ceiling. US transmitters at the base of the right triangle may be designated as the base transmitter. Both legs of the right triangle may run across the top of a respective wall, and the two walls may be perpendicular to each other. More generally, the two walls form two perpendicular reference planes such as reference plane 305 of FIG. 3.

The X, Y position may be determined by applying the principles of FIG. 3 and Eq. (1)-(4) twice, once for each pairing of the base US transmitter with each of the other two US transmitters. For example, assume three US transmitters A, B, C, with US transmitter B being the base US transmitter. US transmitters A-B are aligned along wall W1, and US transmitters B-C are aligned along wall W2. Then the distance from wall W2 may be calculated by applying Eq. (1)-(4) to US transmitter A and B. Similarly, the distance to wall W1 may be calculated by applying Eq. (1)-(4) to US transmitter B and C. Together, this produces a measurement of the X, Y location. One can show that any non-co-linear positioning of the US emitters will allow the pin-pointing of the X, Y, Z position.

Finding the Closest US Emitter.

In an area where there is more than one US transmitter, it is possible to find out which US transmitter is closest to portable device 301 by use of synchronization. Although embodiments are described below with reference to two and three US transmitters, embodiments are scalable to any number of US transmitters.

Portable device 301 can determine which US transmitter it is closest to by considering the time-of-flight (ToF) from each US transmitter. The basic technique is that the ToF is the time difference between when a signal was transmitted by a US transmitter and when the signal was received by portable device 301, and the smallest ToF corresponds to the closest US transmitter. ToF methods usually use knowledge on the part of the US transmitter of when each US signal was transmitted. The time of receipt may be measured directly by portable device 301. To facilitate this ToF method, the US transmitters may be synchronized in time to each other or to a fixed time reference or to a master US transmitter, so that portable device 301 does not need to know separate start times for each US signal. If US signals were transmitted at the same time, then the US transmitter corresponding to the first received US signal is the closest US transmitter to portable device 301. An IR transmitter may be used to provide a fixed time reference.

In other embodiments, an IR transmitter providing a timing beacon as a fixed time reference is not necessarily needed if portable device 301 can determine ToF by use of knowledge of when each US transmitter transmitted its respective signal.

However, such a ToF method has drawbacks. First, if there is no IR timing beacon signal, each US pulse should include an ID, usually as a data field in the US transmission. The ID field makes the US pulse longer, causing greater power consumption by portable device 301 as its US receiver circuitry needs to be energized for a longer time. Second, transmitting multiple US signals at the same time may lead to collisions when received at portable device 301, e.g., when the difference in range to two US transmitters is less than the distance travelled by the US signal during the US pulse.

Embodiments in accordance with the present disclosure address the first drawback above by use of a hybrid method described above in which the IR signal acts as a timing strobe or beacon in order to set a "time of origin," and each US transmitter has a predetermined transmission time with respect to the IR signal, and the US transmitters are non-overlapping with each other.

Figure 6:
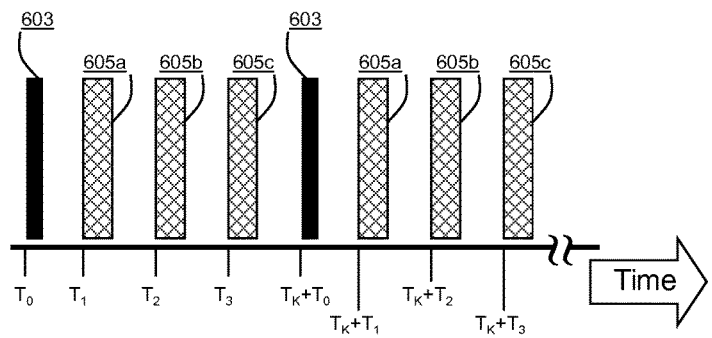
FIG. 6 depicts timing of IR and US signals as transmitted from an emitter, in accordance with another embodiment of the present invention.

FIG. 6 illustrates a transmit timing diagram associated with an embodiment that uses an IR timing signal. The timing diagram is periodic with a cycle period of $T_K$. The start of a cycle may be marked by IR signal 603 from an IR transmitter, transmitted at time $T_0$. First US transmitter transmits US signal 605a at time $T_1$. Second US transmitter transmits US signal 605b at time $T_2$. Third US transmitter transmits US signal 605b at time $T_3$. This pattern repeats each cycle with period $T_K$.

Figure 7:
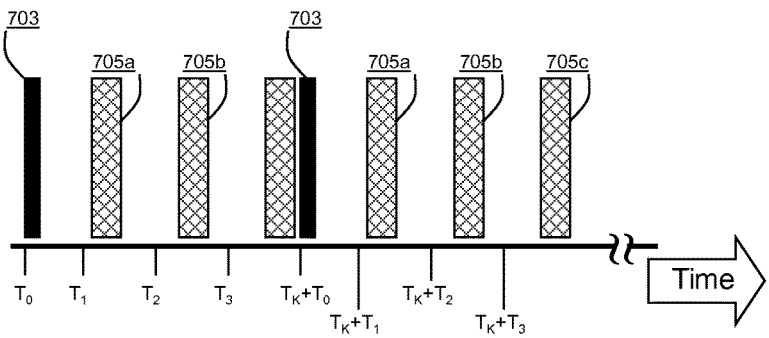
FIG. 7 depicts timing of IR and US signals as received from an emitter at a portable device, in accordance with another embodiment of the present invention.

FIG. 7 illustrates a received timing diagram associated with an embodiment that uses an IR timing signal. The timing diagram is periodic with a cycle period of $T_K$. IR signals 703 propagate essentially instantaneously, so IR signals 703 are received essentially at the same time with respect to $T_0$ as that shown in FIG. 6. In contrast, US signals encounter a relatively large propagation time compared to the IR signal. US signal 605a is received as US signal 705a with a first offset with respect to $T_1$. US signal 605b is received as US signal 705b with a second offset with respect to $T_2$. US signal 605c is received as US signal 705c with a third offset with respect to $T_3$. The first offset, second offset, and third offset varies as portable device 301 moves around in a room. The smallest of the first offset, second offset, and third offset indicates which US transmitter is closest to portable device 301.

Embodiments in accordance with the present disclosure address the second drawback by staggering the transmission of each US signal at different predetermined times or intervals within a cycle. US transmitters repeat transmissions from one cycle to the next. A transmission time delay within a cycle between time-adjacent US signals may be referred to as a stagger time offset. The stagger time offset between transmissions from different US transmitters may be selected depending upon the geometry of the room, e.g., to make sure that all US transmissions from a first US transmitter in a room are ended and dissipated (including multipath, echoes, etc.) before US transmissions from a second US transmitter is started. For example, for three US transmitters in a typical room measuring 15'×15'×8', a one-second stagger time offset and three-second cycle time ordinarily is sufficient. Such embodiments assume that the US transmitters are synchronized with each other and/or with respect to a fixed time reference such as a clock, or with one US transmitter selected to be a master reference. The stagger time offset may be determined in advance and associated with the room ID, such that when a room ID is received by a portable device 301, the room ID may be used to look up in a database the stagger time offset for the room. Once the US transmitters are synchronized to their respective assigned transmission times, portable device 301 may determine the closest US transmitter by measuring the differential time of arrival from among all of the received US signals. This is illustrated in further detail in FIG. 8.

FIG. 8 illustrates a side plan view of room 800, which includes three US transmitters 801, 802 and 803 situated substantially as illustrated along a ceiling. Room 800 further includes three receiving portable devices 811, 812 and 813 situated substantially as illustrated near a floor. Below the depiction of room 800 are four timelines labeled "As transmitted," "As received by Dev 811," "As received by Dev 812," and "As received by Dev 813" (collectively, "timelines"). The timelines are not necessarily drawn to scale. Time advances to the right. The timelines illustrate a cycle 805, the boundaries of which are illustrated with a thick dashed line. The timelines further illustrate three stagger time intervals 804a, 804b, 804c, which are illustrated by light dotted lines. An individual but unspecified interval may be referred to as stagger time interval 804.

The embodiment of FIG. 8 may be useful to determine which of several US transmitters that a predetermined US receiver is closest to. Knowledge of which US transmitter is closest to a US receiver may not yield a highly-localized position for the US transmitter, but may instead yield a zone in which the US receiver may be located.

At a particular portable device, if the difference in arrival times between adjacent US transmissions is shorter than the stagger time interval, then the later-arriving signal is closer. However, if the difference in arrival times between adjacent US transmissions is longer than the stagger time interval, then the earlier-arriving signal is closer. This can be seen with reference to the timelines.

For example, assume the layout of room 800, in which device 811 is closer to first US transmitter 801 than it is to second US transmitter 802, and farthest from third US transmitter 803. Device 812 is approximately equi-distant from first US transmitter 801 and third US transmitter 803, but is closest to second US transmitter 802. Second US transmitter 802 is approximately equidistant from device 811 and device 812. Device 813 is closer to third US transmitter 803 than it is to second US transmitter 802, and farthest from first US transmitter 801. This layout may also be deduced from the timing diagrams. For example, interval 806 as received by device 811 is longer than a stagger time interval 804, therefore first US transmitter 801 is closer to device 811 than second US transmitter 802, In contrast, interval 807 as received by device 812 is shorter than a stagger time interval 804, therefore second US transmitter 802 (the source of the second signal bounded by interval 807) is closer to device 812 than first US transmitter 801 (the source of the first signal bounded by interval 807). Furthermore, interval 808 as received by device 812 is longer than a stagger time interval 804, therefore second US transmitter 802 is closer to device 812 than third US transmitter 803.

Embodiments in accordance with the present disclosure are scalable to additional US transmitters. Assuming that each US transmitter transmits in a predetermined order and at a predetermined time within a cycle (particularly if the US signals do not include an ID field), a relative differential time of arrival may be determined for each possible pair of US transmitters by subtracting the known heartbeat rate in order to yield the closest emitter. For example, for a heartbeat of one second, suppose we will have Times of Arrival (ToA) of $T_1$, $T_2$, and $T_3$ from three respective US transmitters. Embodiments may then calculate times of flight $D_{1,2}-1$, $D_{2,3}-1$ and $D_{1,3}-2$. In this example, the "-2" is needed because the time of transmission between the first and the third pulses was set to exactly two seconds.

Assume that $(D_{1,2}-1)>0$. This means that the first US transmitter is closer to portable device 301 than the second US transmitter is to portable device 301. We now test whether $(D_{1,3}-2)$ is greater or less than zero. If $(D_{1,3}-2)<0$, then the third US transmitter is closer to portable device 301 than the first US transmitter is to portable device 301, and thus in this example the third US transmitter is the closest US emitter to portable device 301.

The disclosed methods may be readily implemented in software, such as by using object or object-oriented software development environments that provide portable source code that can be used on a variety of computer or workstation platforms. Alternatively, the disclosed system may be implemented partially or fully in hardware, such as by using standard logic circuits or VLSI design. Whether software or hardware may be used to implement the systems in accordance with various embodiments of the present invention may be dependent on various considerations, such as the speed or efficiency requirements of the system, the particular function, and the particular software or hardware systems being utilized.

While the foregoing is directed to embodiments of the present invention, other and further embodiments of the present invention may be devised without departing from the basic scope thereof. It is understood that various embodiments described herein may be utilized in combination with any other embodiment described, without departing from the scope contained herein. Further, the foregoing description is not intended to be exhaustive or to limit the invention to the precise form disclosed. Modifications and variations are possible in light of the above teachings or may be acquired from practice of the invention. Certain exemplary embodiments may be identified by use of an open-ended list that includes wording to indicate that the list items are representative of the embodiments and that the list is not intended to represent a closed list exclusive of further embodiments. Such wording may include "e.g.," "etc.," "such as," "for example," "and so forth," "and the like," etc., and other wording as will be apparent from the surrounding context.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items.

Moreover, the claims should not be read as limited to the described order or elements unless stated to that effect. In addition, use of the term "means" in any claim is intended to invoke 35 U.S.C. § 112, ¶6, and any claim without the word "means" is not so intended.

What is claimed is:

1. A position location system to measure a height of a portable device above a floor, the system comprising:
   an infrared (IR) transmitter;
   a first and a second ultrasound (US) transmitters, the first and the second US transmitters arranged at respective predetermined distances from the floor, the floor comprising a first reference plane;
   an IR receiver in the portable device, the IR receiver configured to receive an IR signal from the IR transmitter;
   a US receiver in the portable device, the US receiver configured to receive a first US signal from the first US transmitter and a second US signal from the second US transmitter; and
   a processor in the portable device, the processor coupled to a memory and further coupled to the IR receiver and the US receiver,
   wherein the processor is configured to detect:
      a time of flight (ToF) of the first US signal from the first US transmitter to the US receiver; and
      a ToF of the second US signal from the second US transmitter to the US receiver, and
   wherein the height of the portable device above the floor is measured based upon a detected time difference in ToF between the first and second US signals.

2. The system of claim 1, wherein the first and second US transmitters are arranged along an axis perpendicular to the first reference plane.

3. The system of claim 1, further comprising a third US transmitter to produce a third US signal, wherein the processor is further configured to measure a ToF of the third US signal from the third US transmitter to the US receiver.

4. The system of claim 1, wherein the IR signals comprise identification (ID) information, and the US signals comprise short bursts, wherein the processor is configured to associate the US signals with the ID information from the IR signals by use of a time differential between the reception times of the IR and US signals.

5. The system of claim 1, wherein the IR receiver and the US receiver are installed in a portable tag.

6. The system of claim 1, further comprising a third US transmitter, the first and third US transmitters forming a second reference plane perpendicular to the first reference plane, and the first, second and third US transmitters coplanar in a third reference plane, wherein the third reference plane is perpendicular to the first reference plane and the second reference plane.

7. The system of claim 6, wherein the processor is configured to calculate a spatial position of the US receiver with respect to the first reference plane, the second reference plane, and the third reference plane.

8. The system of claim 6, wherein the first US transmitter, the second US transmitter, and the third US transmitter periodically transmit at a fixed, non-overlapping time with respect to a timing reference.

9. The system of claim 1, wherein the height of the portable device above the floor is determined by the processor in the portable device.

10. The system of claim 1, wherein the height of the portable device above the floor is determined by a processor in a server communicatively coupled to the portable device.

11. A position location system comprising:
    a plurality of base stations, each base station comprising a respective infrared transmitter and ultrasound (US) transmitter, wherein each of the base stations is separate from the portable device; and a receiver in the portable device, the receiver comprising:
an infrared (IR) receiver configured to receive IR signals from at least one IR transmitter; and a US receiver configured to receive US signals from at least one US transmitter.

12. The system of claim 11, wherein each base station is configured to emit periodically said IR signals and said US signals, and wherein the receiver is configured to measure a time difference between receipt of the IR signals from a base station and receipt of US signals from the base station.

13. The system of claim 12, wherein the receiver determines its location from a shortest time differential between reception of an IR signal from a base station and reception of a US signal from the base station.

14. The system of claim 12, wherein the receiver transmits, to a processor not within the receiver, one of times and time differences for each received IR and US signal, and wherein the processor not within the receiver is configured to determine a location of the receiver from the one of times and time differences.

15. The system of claim 11, wherein the IR signals comprise identification (ID) information, and the US signals comprise short bursts, wherein the processor is configured to associate the US signals with the ID information from the IR signals by use of a time differential between the reception times of the IR and US signals.

16. A position location system to measure a position of a portable device relative to emitters, the system comprising:
a first ultrasound (US) transmitter located at a first predetermined location separate from the portable device and configured to transmit a first periodic burst signal;
a second US transmitter located at a second predetermined location separate from the portable device, the second predetermined location different than the first predetermined location and configured to transmit a second periodic burst signal, the second periodic burst signal having a predetermined timing offset from the first periodic burst signal;
a US receiver in the portable device, the US receiver configured to receive a first US signal from the first US transmitter and a second US signal from the second US transmitter; and
a processor coupled to a memory and further coupled to the US receiver,
wherein a closer of the first US transmitter and the second US transmitter is detected based upon a time difference between the reception times of the first US transmitter and second US transmitter.

17. The system of claim 16, wherein the last-received US signal, from among two received US signals, corresponds to a closest base station if a difference between the two received US signals is smaller than a US transmission interval.

18. The system of claim 16, wherein the first-received US signal, from among two received US signals, corresponds to a closest base station if a difference between the two received US signals is larger than a US transmission interval.

19. A method to determine a position location of a portable device relative to emitters, the method comprising:
receiving a periodic infrared (IR) signal from an IR emitter located at a predetermined location separate from the portable device;
receiving a first ultrasound (US) signal from a first US emitter located at a first predetermined location separate from the portable device;
receiving a second US signal from a second US emitter located at a second predetermined location separate from the portable device;
determining, by a processor in the portable device, a first time of flight (ToF) of the first US signal to the US receiver;
determining, by the processor, a second ToF of the second US signal to the US receiver; and
determining a location of the portable device relative to the emitters based upon the first ToF and the second ToF.

20. The method of claim 19, wherein the step of determining a location comprises determining a shortest time differential between reception of an IR signal and reception of a US signal.

21. The method of claim 19, further comprising: transmitting to a processor one of times and time differences for each received IR and US signal, and wherein the processor is configured to determine a location of the receiver from the one of times and time differences.

22. The method of claim 19, further comprising the step of associating the US signals with ID information from the IR signals by use of a time differential between the reception times of the IR and US signals, wherein the IR signals comprise identification (ID) information.

* * * * *